United States Patent
Werner

(10) Patent No.: US 7,917,629 B2
(45) Date of Patent: *Mar. 29, 2011

(54) INTERFACE FOR EXTERNAL SYSTEM MANAGEMENT

(75) Inventor: Randolf Werner, Wiesloch-Baicrtal (DE)

(73) Assignee: SAP AG, Walldorf (DE)

( * ) Notice: Subject to any disclaimer, the term of this patent is extended or adjusted under 35 U.S.C. 154(b) by 887 days.

This patent is subject to a terminal disclaimer.

(21) Appl. No.: 11/027,812

(22) Filed: Dec. 29, 2004

(65) Prior Publication Data

US 2006/0167980 A1    Jul. 27, 2006

(51) Int. Cl.
*G06F 15/16* (2006.01)
(52) U.S. Cl. ............................. 709/227; 707/1
(58) Field of Classification Search .................. 709/223, 709/227, 228
See application file for complete search history.

(56) References Cited

U.S. PATENT DOCUMENTS

| | | | |
|---|---|---|---|
| 5,999,179 A * | 12/1999 | Kekic et al. ................... | 715/734 |
| 6,282,566 B1 | 8/2001 | Lee, Jr. et al. | |
| 6,345,386 B1 | 2/2002 | Delo et al. | |
| 6,424,828 B1 | 7/2002 | Collins et al. | |
| 6,553,377 B1 | 4/2003 | Eschelbeck et al. | |
| 6,763,226 B1 * | 7/2004 | McZeal, Jr. ................... | 455/90.2 |
| 6,769,022 B1 * | 7/2004 | DeKoning et al. ............ | 709/223 |
| 7,013,327 B1 | 3/2006 | Hickman et al. | |
| 7,024,695 B1 | 4/2006 | Kumar et al. | |
| 7,069,293 B2 * | 6/2006 | Cox et al. ...................... | 709/203 |
| 7,203,769 B2 | 4/2007 | Schnier | |
| 7,296,267 B2 | 11/2007 | Cota-Robles et al. | |
| 7,302,423 B2 | 11/2007 | De Bellis | |
| 7,454,443 B2 * | 11/2008 | Ram et al. ............................. | 1/1 |
| 7,502,353 B2 * | 3/2009 | Bolz .............................. | 370/338 |
| 7,509,426 B2 * | 3/2009 | Park et al. ..................... | 709/227 |
| 2002/0078060 A1 | 6/2002 | Garst et al. | |
| 2002/0129264 A1 | 9/2002 | Rowland et al. | |
| 2002/0184398 A1 * | 12/2002 | Orenshteyn ................... | 709/310 |
| 2003/0014521 A1 | 1/2003 | Elson et al. | |
| 2003/0061404 A1 * | 3/2003 | Atwal et al. .................. | 709/328 |
| 2003/0084248 A1 | 5/2003 | Gaither et al. | |
| 2003/0139174 A1 * | 7/2003 | Rao .................. | 455/418 |
| 2003/0158919 A1 * | 8/2003 | Fomenko ...................... | 709/220 |
| 2003/0177356 A1 | 9/2003 | Abela | |

(Continued)

FOREIGN PATENT DOCUMENTS

WO        WO 00/23898        4/2000

OTHER PUBLICATIONS

"FOA Mailed Aug. 17, 2007 for U.S. Appl. No. 11/013,277", (Aug. 17, 2007), Whole Document.

(Continued)

*Primary Examiner* — William C Vaughn, Jr.
*Assistant Examiner* — Ninos Donabed
(74) *Attorney, Agent, or Firm* — Blakely Sokoloff Taylor & Zafman

(57) ABSTRACT

A system and method for an interface for external system management is disclosed. According to an embodiment of the invention, a method includes connecting a first client system with a web service of a server, the server including an application, the client system utilizing one of a plurality of computer platforms; and receiving a management instruction from the first client system using the web service.

11 Claims, 7 Drawing Sheets

U.S. PATENT DOCUMENTS

| | | | |
|---|---|---|---|
| 2003/0177382 A1 | 9/2003 | Ofek et al. | |
| 2003/0195923 A1 | 10/2003 | Bloch et al. | |
| 2003/0212654 A1 | 11/2003 | Harper et al. | |
| 2004/0003033 A1* | 1/2004 | Kamen et al. | 709/203 |
| 2004/0024971 A1 | 2/2004 | Bogin et al. | |
| 2004/0083280 A1* | 4/2004 | Houston et al. | 709/223 |
| 2004/0181537 A1 | 9/2004 | Chawla et al. | |
| 2004/0193461 A1* | 9/2004 | Keohane et al. | 705/7 |
| 2004/0205144 A1* | 10/2004 | Otake | 709/208 |
| 2005/0038771 A1* | 2/2005 | Sugihara et al. | 707/1 |
| 2005/0066037 A1* | 3/2005 | Song et al. | 709/227 |
| 2005/0138183 A1* | 6/2005 | O'Rourke et al. | 709/228 |
| 2005/0144301 A1* | 6/2005 | Park et al. | 709/230 |
| 2005/0228863 A1 | 10/2005 | Palmeri et al. | |
| 2005/0278346 A1 | 12/2005 | Shang et al. | |
| 2006/0053112 A1 | 3/2006 | Chitkara et al. | |
| 2006/0206856 A1 | 9/2006 | Breeden et al. | |

OTHER PUBLICATIONS

"OA Mailed Jan. 7, 2008 for U.S. Appl. No. 11/013,277", (Jan. 7, 2008), Whole Document.

"OA Mailed Mar. 12, 2007 for U.S. Appl. No. 11/013,277", (Mar. 12, 2007), Whole Document.

"FOA Mailed Aug. 17, 2007 for U.S. Appl. No. 11/013,278", (Aug. 17, 2007), Whole Document.

"OA Mailed Feb. 5, 2008 for U.S. Appl. No. 11/013,278", (Feb. 5, 2008), Whole Document.

"OA Mailed Mar. 16, 2007 for U.S. Appl. No. 11/013,278", (Mar. 16, 2007), Whole Document.

"FOA Mailed Aug. 28, 2007 for U.S. Appl. No. 11/012,803", (Aug. 28, 2007), Whole Document.

"OA Mailed Jan. 24, 2008 for U.S. Appl. No. 11/012,803", (Jan. 24, 2008), Whole Document.

"OA Mailed Mar. 16, 2007 for U.S. Appl. No. 11/012,803", (Mar. 16, 2007), Whole Document.

"OA Mailed Jan. 10, 2008 for U.S. Appl. No. 11/027,387", (Jan. 10, 2008), Whole Document.

"OA Mailed Apr. 19, 2007 for U.S. Appl. No. 11/027,387", (Apr. 19, 2007), Whole Document.

Non-Final Office Action for U.S. Appl. No. 11/013,278, Mailed Dec. 23, 2008, 28 pages.

Non-Final Office Action for U.S. Appl. No. 11/012,803, Mailed Dec. 23, 2008, 22 pages..

Non-Final Office Action for U.S. Appl. No. 11/026,604, Mailed Dec. 30, 2008, 18 pages.

" FOA Mailed Aug. 13, 2008 for U.S. Appl. No. 11/013,278 Whole Document", (Aug. 13, 2008).

" FOA Mailed Aug. 17, 2007 for U.S. Appl. No. 11/013,277", (Aug. 17, 2007), Whole Document.

"OA Mailed Jan. 7, 2008 for U.S. Appl. No. 11/013,277", (Jan. 7, 2008), Whole Document.

"OA Mailed Mar. 12, 2007 for U.S. Appl. No. 11/013,277", (Mar. 12, 2007), Whole Document.

"FOA Mailed Aug. 17, 2007 for U.S. Appl. No. 11/013,278", (Aug. 17, 2007), Whole Document.

"OA Mailed Feb. 5, 2008 for U.S. Appl. No. 11/013,278", (Feb. 5, 2008), Whole Document.

" OA Mailed Mar. 16, 2007 for U.S. Appl. No. 11/013,278", (Mar. 16, 2007), Whole Document.

"FOA Mailed Aug. 28, 2007 for U.S. Appl. No. 11/012,803", (Aug. 28, 2007), Whole Document.

" OA Mailed Jan. 24, 2008 for U.S. Appl. No. 11/012,803", (Jan. 24, 2008), Whole Document.

" OA Mailed Mar. 16, 2007 for U.S. Appl. No. 11/012,803", (Mar. 16, 2007), Whole Document.

"OA Mailed Jan. 10, 2008 for U.S. Appl. No. 11/027,387", (Jan. 10, 2008), Whole Document.

" OA Mailed Apr. 19, 2007 for U.S. Appl. No. 11/027,387", (Apr. 19, 2007), Whole Document.

Galchev, Galin, "Plug-In Based Caching Architecture Capable of Implementing Multiple Cache Regions Per Application", U.S. Appl. No. 11/024,554, filed Dec. 28, 2004—Non-Final Office Acion mailed May 28, 2008, (May 28, 2008), 7 pgs.

USPTO, "OA Mailed Sep. 4, 2008 for U.S. Appl. 11/026,323", (Sep. 4, 2008), Whole Document.

USPTO, "OA Mailed Oct. 3, 2008 for U.S. Appl. 11/027,387", (Oct. 3, 2008), Whole Document.

Notice of Allowance for U.S. Appl. No. 11/013,278, Mailed Jun. 11, 2009, 25 pages.

Notice of Allowance for U.S. Appl. No. 11/012,803, Mailed Jun. 10, 2009, 27 pages.

"Notice of Allowance for U.S. Appl. No. 11/013,277, Mailed Jun. 25, 2009, 24 pages", (Jun. 28, 2009).

Notice of Allowance for U.S. Appl. No. 11/026,323, Mailed Jul. 27, 2009, 9 pages.

Notice of Allowance for U.S. Appl. No. 11/027,387, Mailed Aug. 7, 2009, 10 pages.

Notice of Allowability for U.S. Appl. No. 11/012,803, Mailed Sep. 3, 2009, 12 Pages.

Final Office Action for U.S. Appl. No. 11/026,604, Mailed Sep. 24, 2009, 18 Pages.

Non-Final Office Action for U.S. Appl. No. 11/026,604, mailed Mar. 4, 2010, 15 Pages.

Non-Final Office Action for U.S. Appl. No. 11/026,604, mailed Aug. 19, 2010, 14 Pages.

Non-Final Office Action for U.S. Appl. No. 11/026,604, Mailed Jan. 27, 2009, 18 pages.

Notice of Allowance for U.S. Appl. No. 11/027,387, Mailed Feb. 23, 2009, 8 pages.

Notice of Allowance for U.S. Appl. No. 11/026,323, Mailed Feb. 25, 2009, 19 pages.

Final Office Action for U.S. Appl. No. 11/012,803. Mailed Jul. 22, 2008, 22 pages.

Final Office Action for U.S. Appl. No. 11/013,277, Mailed Aug. 7, 2008, 22 pages.

Non-Final Office Action for U.S. Appl. No. 11/013,277, Mailed Jan. 6, 2009, 22 pages.

* cited by examiner

US 7,917,629 B2

INTERFACE FOR EXTERNAL SYSTEM MANAGEMENT

TECHNICAL FIELD

Embodiments of the invention generally relate to the field of client/server systems and, more particularly, to an interface for external system management.

BACKGROUND

A server may support the operation of various types of applications or other systems. In such a computing environment, external management of a system instance may be provided in some cases. External management of an application may provide outside control and monitoring of the application, including such functions as system start-up and shutdown and analysis of various system states that may not be practical or allowable from within the system.

However, the variety of client platforms that may be used for external management may complicate system operations. In conventional server operations, external monitoring of system operations may be provided in some forms, but a conventional management system is generally inflexible and is not compatible with multiple clients.

Management operations by heterogeneous platforms generally require different types of processes and interfaces. In one possible example, management operations for Microsoft Windows environments are not necessarily compatible with any other platform. In conventional systems, an interface that is intended to connect with an external manager will be limited to a certain environment, thus requiring that multiple interfaces be provided if multiple different client platforms are to be served.

SUMMARY OF THE INVENTION

A system and method for an interface for external system management are described.

According to a first embodiment of the invention, a method includes connecting a client system with a web service of a server, where the server includes an application and where the client system utilizes one of a plurality of computer platforms; and receiving a management instruction from the first client system utilizing the web service.

Under a second embodiment of the invention, a server includes a program engine, with the program engine including an application. The server further includes a web service interface to connect an external client with the application.

Under a third embodiment of the invention, a system includes an application server, with the application server supporting an application. The system further includes an interface that is web service based. The interface may provide a connection between an external system and the application for management of the application.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
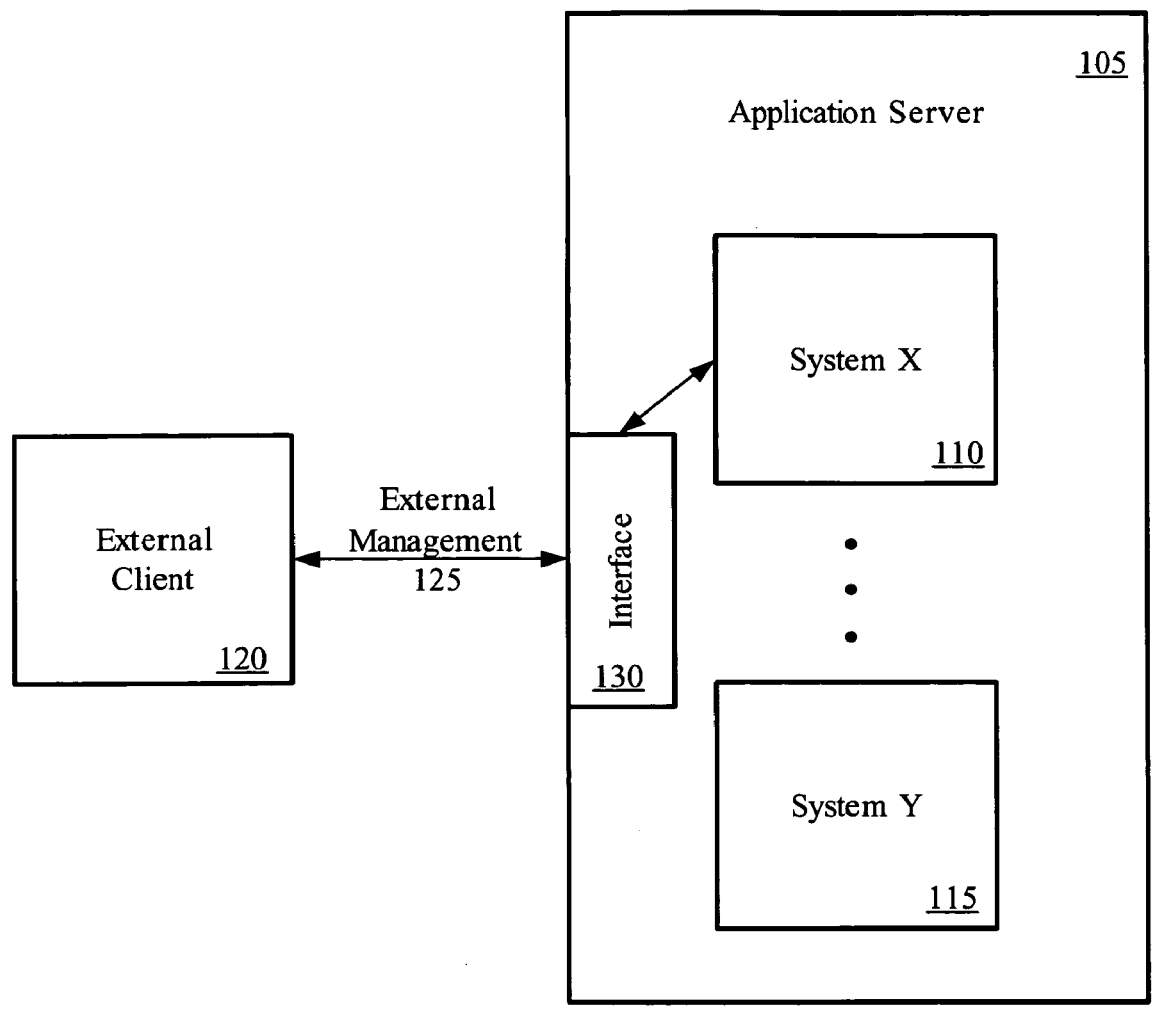
FIG. 1 is an illustration of an embodiment of server and client systems.

Embodiments of the invention are generally directed to a system and method for an interface for external system management.

As used herein, "Web service" means a software application assessable in a web environment. Web service includes the term as used by the World Wide Web Consortium (W3C) in applicable standards.

In one embodiment of the invention, an interface is provided to support multiple external client systems. In one embodiment, a platform independent management service is provided for a variety of client platforms. In one embodiment, multiple different types of external clients are able to connect utilizing a single type of interface.

In one embodiment, external system management is implemented in a web service interface. In such embodiment, an external manager of a system accesses a web service for monitoring of an application or other system. In one embodiment, a server registers a web service as an interface for external clients. A client system seeking to manage a system on the server finds the web service and binds the web service in order to engage in management activities with regard to the system.

In an embodiment of a web application server, a startup and control framework may be utilized to start, stop, and monitor a system such as a J2EE™ (Java™ 2 Platform, Enterprise Edition) instance. An embodiment of a monitoring system may provide improved functionality for J2EE monitoring. The framework may be used to monitor and control an application remotely. In one embodiment of the invention, a web service is used in the startup and control framework. In one embodiment, a single startup and control framework may be addressed by multiple types of client systems for application monitoring and control. In one embodiment, a platform independent framework is provided for external management of systems. In an embodiment, an application server (a component server that is compliant with the J2EE environment) may be accessed by different multiple systems using the same interface.

In one embodiment of the invention, a startup and control program, such as, for example, the Jcontrol program utilized in a product produced by SAP AG (SAP), is started through a web service interface. In an embodiment, the web service interface may start the startup and control program regardless of the type of platform utilized by a client. In one example, a managed system may comprise a J2EE instance. The startup and control program may initialize and monitor the J2EE instance, continuously checking the status of the elements of the instance and restarting any terminated processes.

In general, a web service provides a software system designed to support interoperable machine-to-machine interaction over a network. Web services conform to certain standards and thus provide a means of communication between applications on different platforms. Web services provide a mechanism for applications to communicate and interrelate in a platform independent fashion. Web services therefore may enable a service-oriented architecture in which certain services are reusable and transferable among heterogeneous environments, providing a common method for actions such as accessing data, providing instructions, and instituting other such actions.

Under an embodiment of the invention, a web service interface is implemented in a J2EE (Java 2 Platform, Enterprise Edition) platform. The J2EE platform is described in the J2EE specification, including as provided in version 1.4, Nov. 24, 2003. The implementation of a web service in a J2EE platform assists in providing portability of the client management processes.

The standards that are followed in web services include the use of XML (eXtensible Mark-up Language) for communication, including Extensible Markup Language (XML) 1.0 (Third Edition), Feb. 4, 2004, by the World Wide Web Consortium (W3C); SOAP (simple object access protocol) for the exchange of information, including SOAP Version 1.2, Jun. 24, 2003 by the W3C; WSDL (web services description language) for description of web service details, including Web Service Description Language Version 2.0, Aug. 3, 2003 by the W3C; and UDDI (universal description, discovery, and integration) for looking up web services, including Universal Description, Discover, and Integration Version 3.0. Numerous other specifications and recommendations may affect the structure and design of a web service. A web service has an interface that is described in a machine-processable format, with such format being WSDL. Other systems will interact with a web service in the manner that is prescribed in the web service's description using SOAP-messages, which are typically conveyed using HTTP (Hypertext Transfer Protocol).

Under an embodiment, a web service interface for monitoring systems is implemented using an open source product. In one embodiment, a system is implemented with SOAP, which is a light-weight protocol for exchanging messages between computer software. SOAP is intended to provide an extensible and decentralized framework that can work over multiple computer network protocol stacks. In this regard, remote procedure calls can be modeled as an interaction of several SOAP messages. SOAP can be run on top of all Internet protocols, but SOAP is commonly run on HTTP, as provided by W3C.

In general, any web service enabled client that can handle XML-RPC (Remote Procedure Calling) encoded communications may access a web service interface. XML-RPC includes a set of implementations to allow software running on disparate operating systems in different environments to make procedure calls over the Internet. The XML-RPC is defined by the relevant specification, XML-RPC Specification, Jun. 15, 1999. The applicable clients may include, but are not limited to, C/C++, Microsoft® .NET, Java, and numerous other clients.

For the purposes of web services, when one application is to allow connection and access by other applications, the process is described utilizing WSDL. WSDL is used to specify details of a web service, thereby allowing an external system to utilize the web service without prior knowledge of details of the web service. WSDL provides a format that describes a network service as a set of endpoints operating on messages containing either document-oriented or procedure-oriented information. A WSDL document defines services as collections of network endpoints, or ports. In WSDL, the abstract definition of endpoints and messages is separated from the defined network deployment or data format bindings. This process thereby allows the reuse of abstract definitions, the definitions being messages, which are abstract descriptions of the data being exchanged, and port types, which are abstract collections of operations. The concrete protocol and data format specifications for a particular port type constitute a reusable binding. A port is defined by associating a network address with a reusable binding, with a collection of ports defining a service. In the provision of a web service, a WSDL document uses the following elements in the definition of services:

(a) Types—A container for data type definitions using a type system;

(b) Message—An abstract, typed definition of data being communicated;

(c) Operation—An abstract description of an action supported by the service;

(d) Port Type—An abstract set of operations supported by one or more endpoints;

(e) Binding—A concrete protocol and data format specification for a particular port type;

(f) Port—A single endpoint defined as a combination of a binding and a network address; and (g) Service—A collection of related endpoints.

In one embodiment of the invention, a server provides a web service interface for multiple types of systems. An external client system manages the one or more systems utilizing the web service. In one embodiment, the web service provides a portable interface for the client system, and the client system may access the web service with an arbitrary type of platform if the platform is enabled for web service access.

FIG. 1 is an illustration of an embodiment of server and client systems. In this illustration, an application server 105 includes one or more systems, shown as system X 110 through system Y 115. In one example, an external client 120 seeks to provide external management 125 of system X 110. In one embodiment of the invention, the external client 120 connects with the application server 105 through an interface 130, with the interface 130 supporting multiple different types of client platforms such that a single interface 130 may be used to support various different clients.

Figure 2:
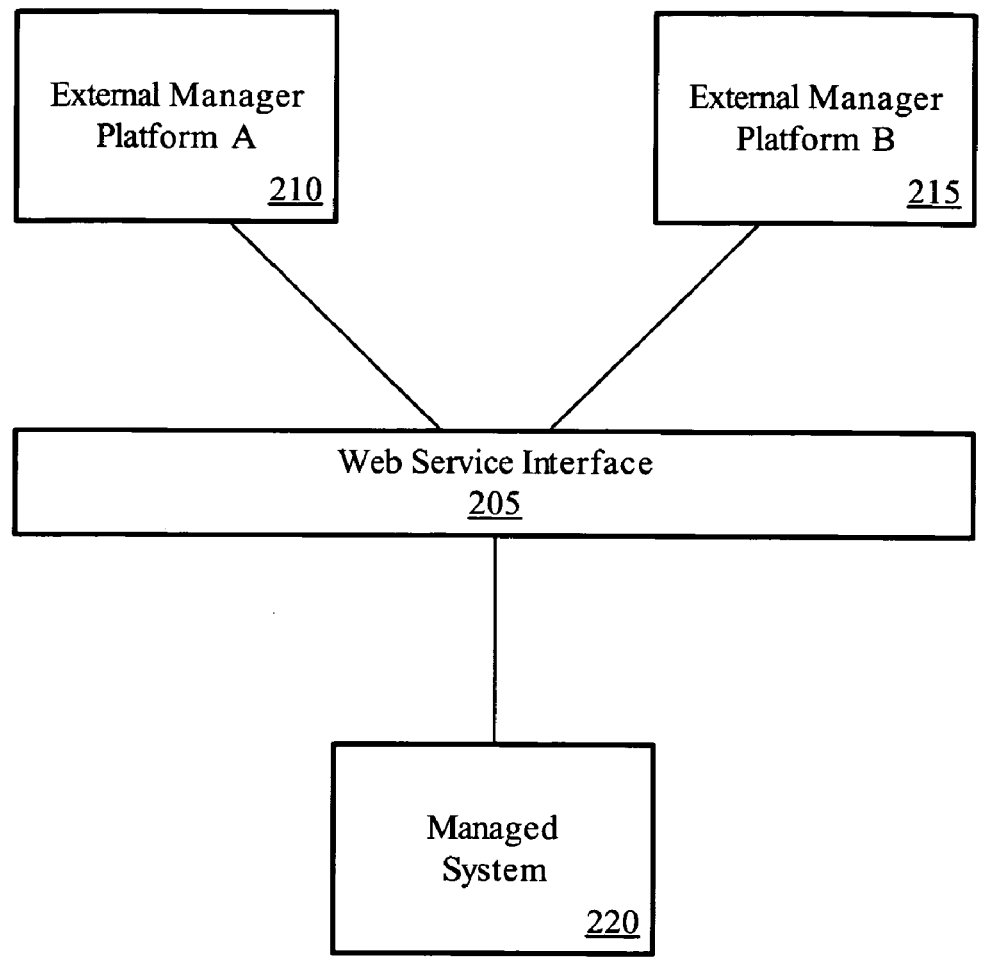
FIG. 2 is an illustration of an embodiment of external management utilizing a web service interface.

FIG. 2 is an illustration of an embodiment of external management utilizing a web service interface. In one embodiment, a web service 205 is used to provide an interface with client systems to externally manage a system. In this illustration, a managed system 120 may be managed either by a first external manager utilizing platform A 210 or a second external manager utilizing platform B 215. Utilizing the web service interface 205, either of the external managers may manage the system 220 using the same interface. The web service provides an interface that can be utilized by many different types of systems, thus providing a single point of access for client systems.

Figure 3:
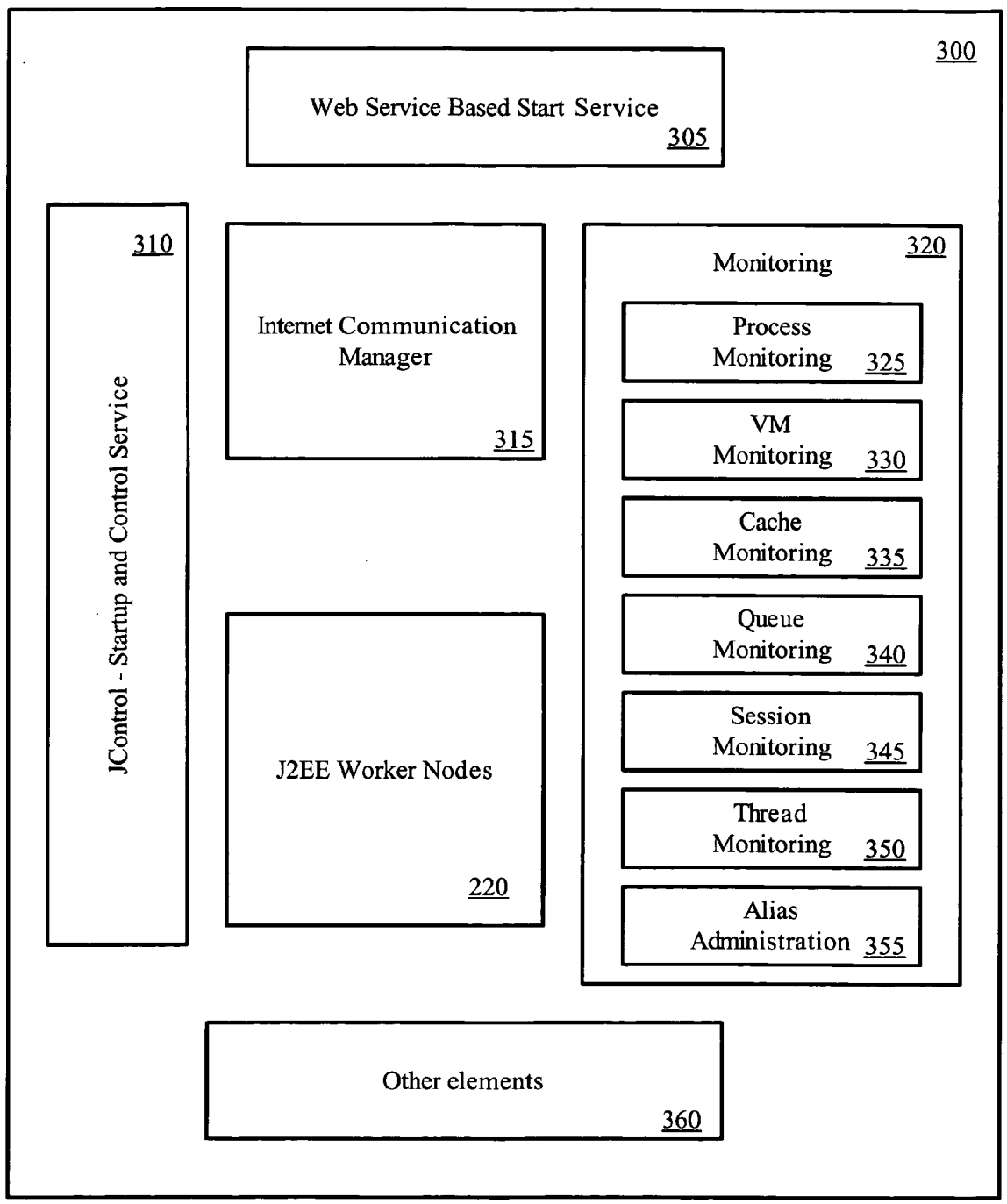
FIG. 3 is an illustration of an embodiment of an externally managed J2EE instance.

FIG. 3 is an illustration of an embodiment of an externally managed J2EE instance. In this illustration, a J2EE instance 300 includes a web service based start service 305 that operates in conjunction with a universal interface for multiple different types of client platforms. For any supported platform, the web service based start system 305 will initiate a startup and control service 310. The startup and control service 310 may then provide startup and control of J2EE worker nodes 220. The figure also illustrates an Internet communication manager 315 to provide communications for the instance 300. Further, there is shown monitoring elements 320 to monitor operations of the instance 300. The monitoring 320 may include, but is not limited to, process monitoring 325, virtual machine (VM) monitoring 330, cache monitoring 335, queue monitoring 340, session monitoring 345, thread monitoring 350, and alias administration 355. Other elements 360 may also be included in the J2EE instance 300.

Figure 4:
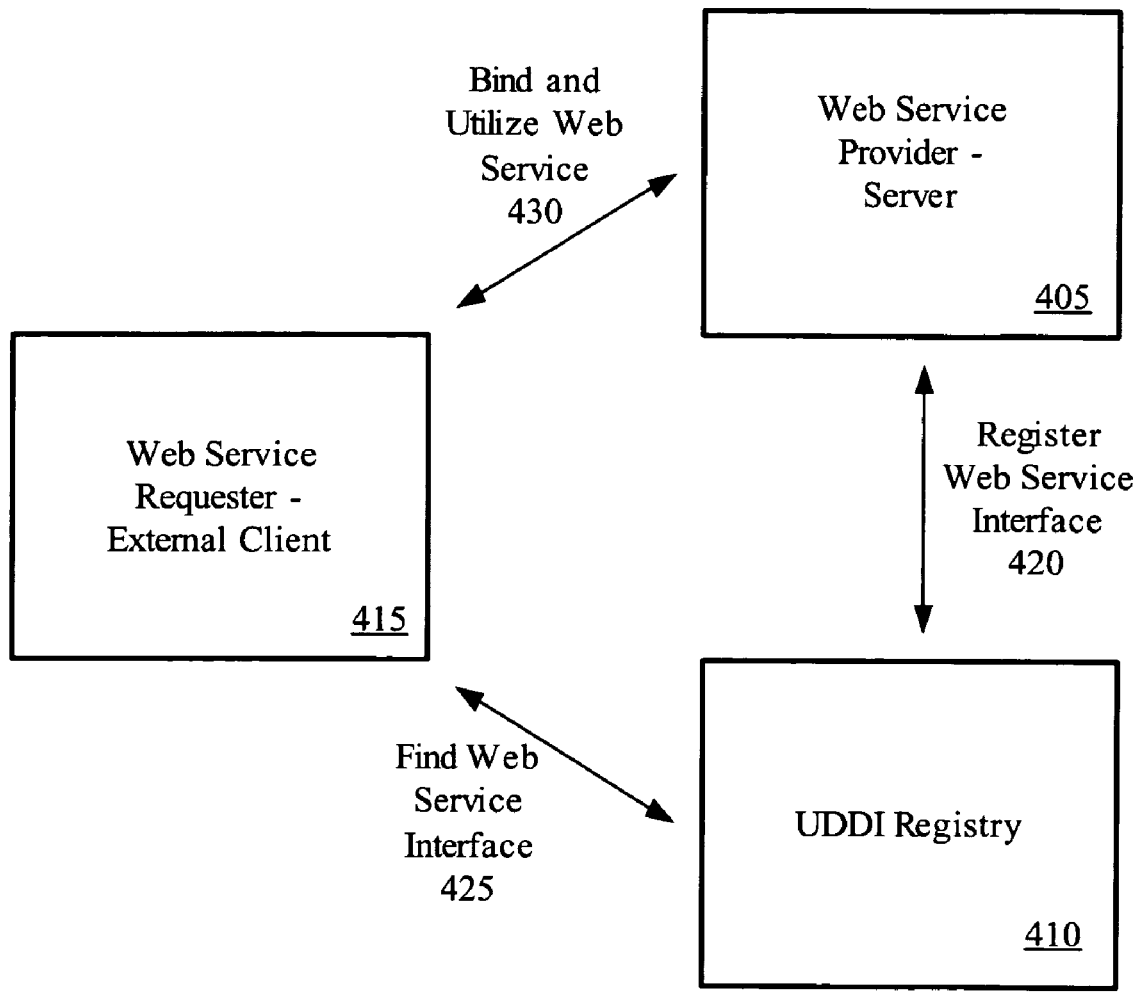
FIG. 4 illustrates an embodiment of web service processes for external management.

FIG. 4 illustrates an embodiment of web service processes for external management. In this illustration, a web service provider 405, such as an application server, utilizes a UDDI registry 410 to establish a web service interface. The web service provider 405 registers the web service 420 with the UDDI registry 410. A web service requester, such as an external client seeking to provide external management of a system, finds the web service interface 425 using the UDDI registry. The web service requester 415 then binds and utilizes the web service interface 430. Using the illustrated processes, an external client system is able to provide management of a system with any platform that can access a web service, thereby providing a very flexible and convenient system for external system management.

Figure 5:
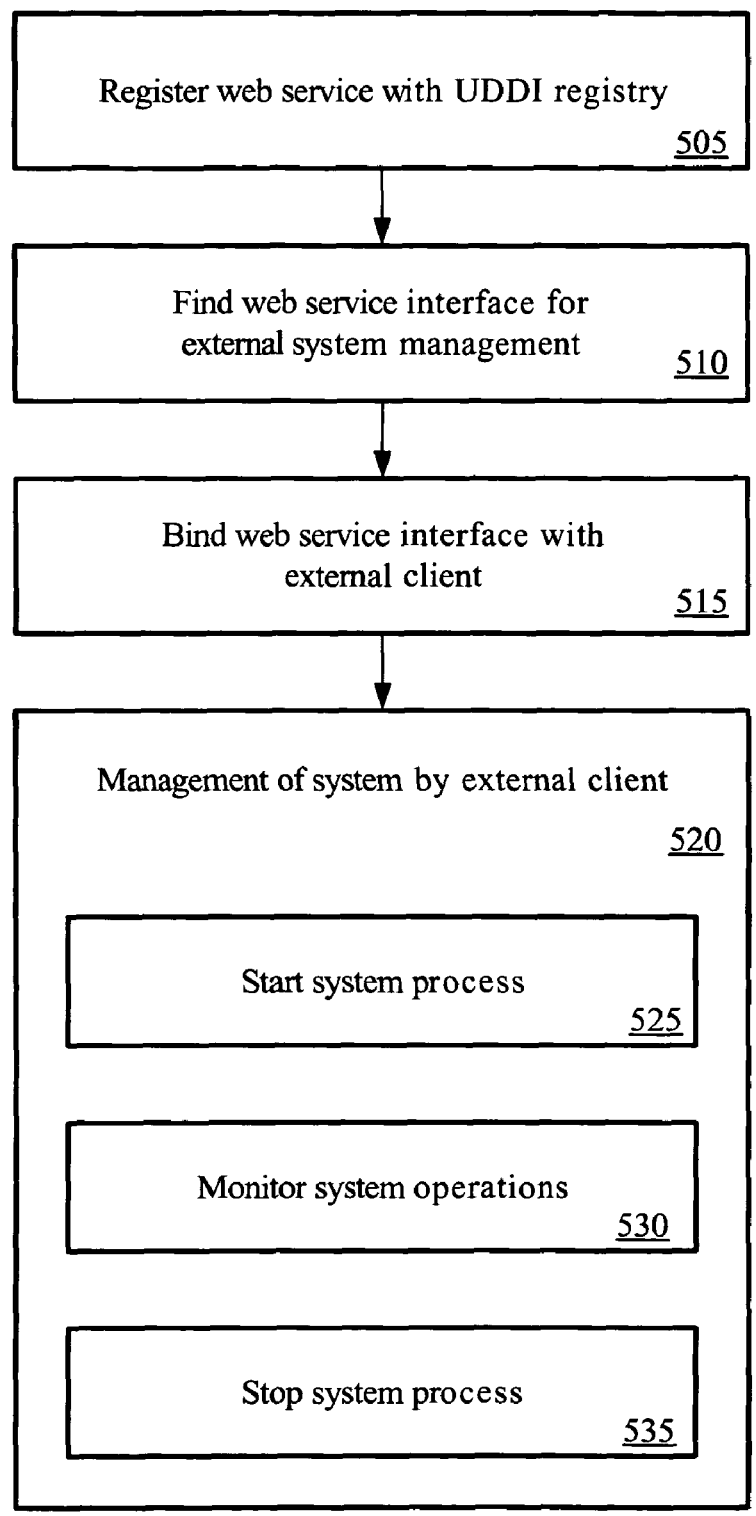
FIG. 5 is a flowchart to illustrate certain processes for an embodiment of system control using a web service based interface.

FIG. 5 is a flowchart to illustrate certain processes for an embodiment of system control using a web service based interface. In this illustration, a web service to provide an interface with external clients for external management is registered with a UDDI registry 505. The web service interface is found 510. In an embodiment of the invention, the use of a web service allows the interface to support multiple different types of client platforms. The web service interface is bound with the external client 515. Using the web service interface, the external client is able to conduct management of the system 520. The management may include starting a system process 525, monitoring system operations 530, and stopping the system process 535.

Figure 6:
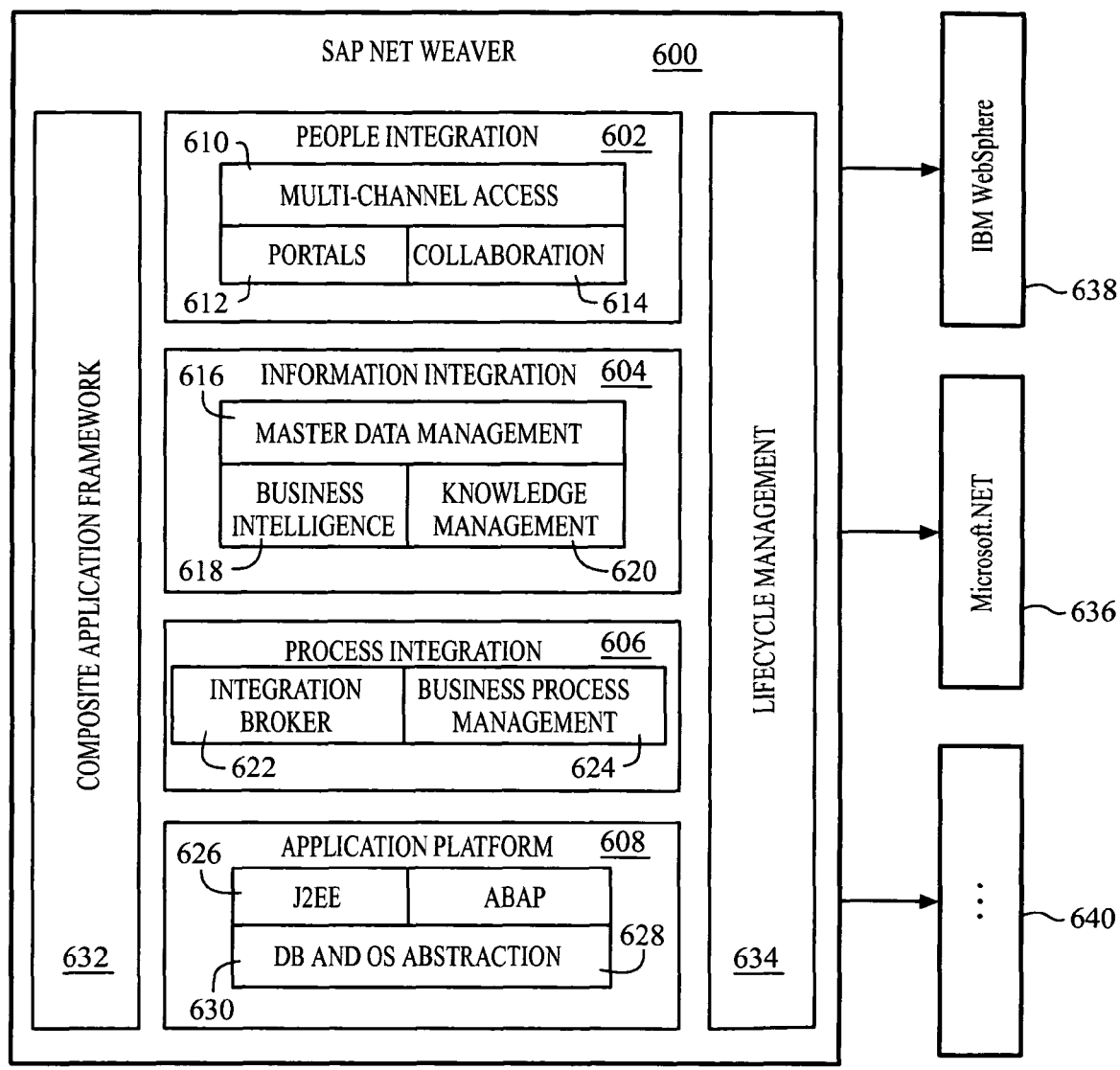
FIG. 6 is a diagram illustrating an embodiment of a system architecture.

FIG. 6 is a diagram illustrating an embodiment of a system architecture. In one embodiment, the diagram illustrates core components of the SAP NetWeaver architecture 600, in which a web service interface for external management may be implemented. The system architecture 600 comprises various SAP platforms that are merged together to provide the integration of people, information, and processes in one solution. The architecture 600 includes people integration 602, information integration 604, process integration 606, and an application platform 608.

People integration 602 is performed using a portal solution 612 and a platform to work in collaboration 614. Users are provided a multi-channel access 610 to ensure mobility. Examples of the portal solution 612 include SAP Enterprise Portal, SAP Mobile Engine, and Collaboration Package for SAP Enterprise Portal. Information integration 604 refers to the conversion of information into knowledge. Information integration 604 provides efficient business intelligence 618 and knowledge management 620 using, for example, SAP products such as Business Information Warehouse (BW) and Knowledge Management (KM). Further, consolidation of master data management beyond system boundaries is performed using SAP's Master Data Management (MDM) 616. Process integration 606 refers to optimized process management using integration broker or SAP exchange infrastructure 622 and business process management 624 techniques. Examples of products to perform process integration 606 include Exchange Infrastructure (XI) and Business Process Management (BPM).

An application platform 608 may include SAP's Web Application Server (Web AS), which is the basis for SAP applications. Web AS, which may be independent of the database and operating system 630, includes a J2EE engine 626 in combination with the proprietary ABAP (Advanced Business Application Programming) engine or instance 628 to further enhance the application platform 608. In one embodiment, the application platform 608 includes operation of a web service to provide an interface for heterogeneous external clients to manage systems provided by the application platform 608.

The architecture 600 further includes a composite application framework 632 to provide various open interfaces (APIs) and a lifecycle management 634, which is an extension of a previously existing transport management system (TMS). As illustrated, the architecture 600 further provides communication with Microsoft.NET 636, International Business Machine (IBM) WebSphere 638, and other such systems 640.

Figure 7:
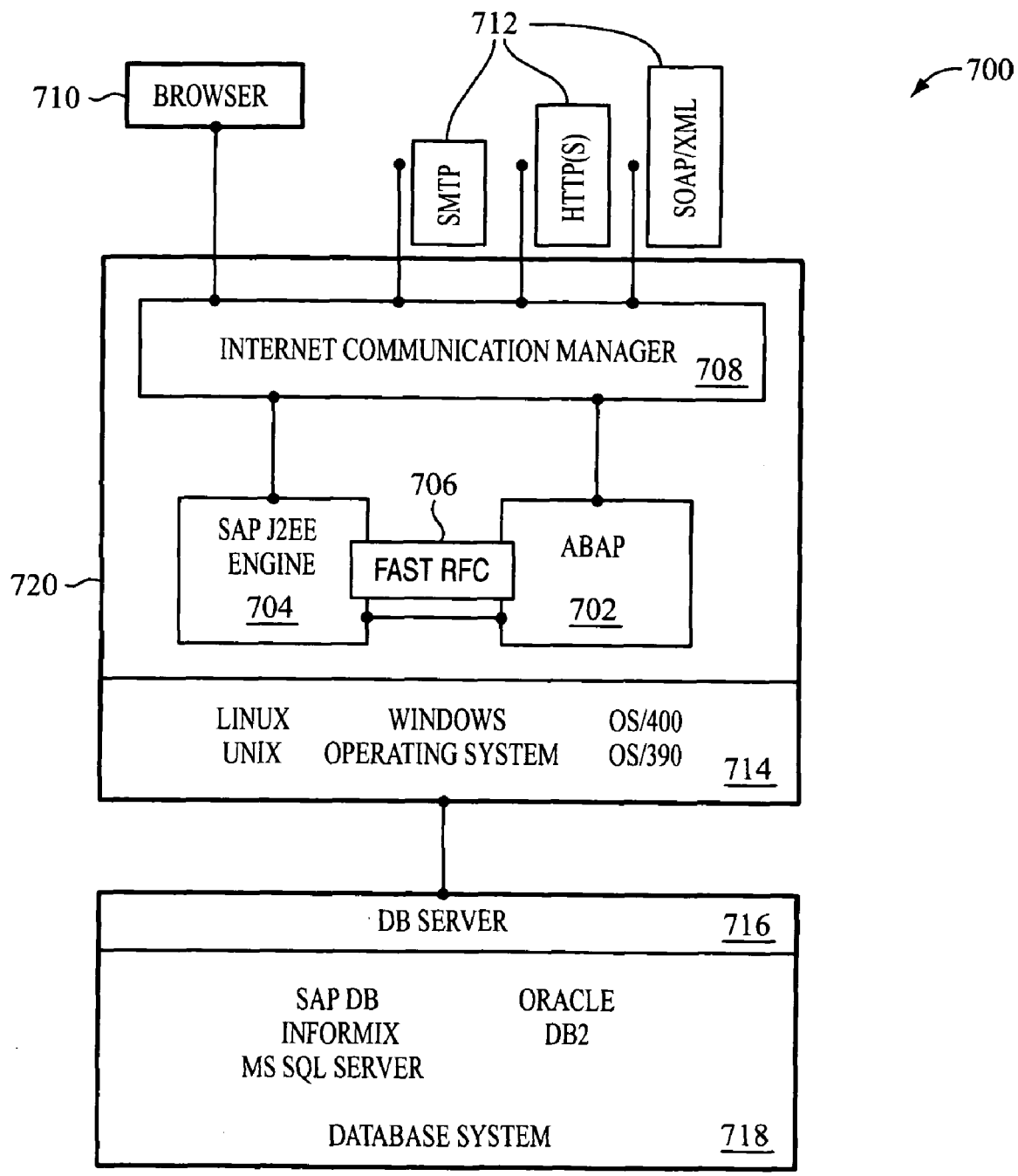
FIG. 7 is a block diagram illustrating an embodiment of an architecture including a Web Application Server.

FIG. 7 is a block diagram illustrating an embodiment of an architecture including a Web Application Server. In this illustration, an architecture 700 serves as an application platform (which may be, for example, the application platform 608 of provided in FIG. 2) for SAP NetWeaver and other SAP products. The architecture 700 includes a Web AS 720 having an ABAP program engine 702, which provides the ABAP development and runtime environment, with the dependability, scalability, and inter-process independence of operating systems 714 and database systems 718. The operating system 714 may include LINUX, UNIX, Windows, OS/390, OS/400, and other such operating systems. The database system 718 may include SAP database (SAP DB), Informix, Oracle, DB2, and other such database systems. The database system 718 is based on a database server 716, such as Microsoft Sequential Query Language (MS SQL) server.

The Web AS 720 with ABAP engine 702 further includes a J2EE program engine 704. The J2EE may support one or more program instances. The J2EE engine 704 is in communication with the ABAP engine 702 via a fast Remote Function Call (RFC) connection 706. The ABAP engine 702 and the J2EE engine 704 are further in communication with an Internet Communication Manager (ICM) 708. The ICM 708 is provided for handling and distributing queries to various individual components of the architecture 700. The architecture 700 further supports a browser 710, such as Microsoft Internet Explorer, Netscape Navigator, and other modified variations of mobile end devices, such as personal digital assistants (PDAs), pocket computers, smart cell phones, other hybrid devices, and the like. The Web AS 720 also supports various protocols and standards 712, such as HyperText Markup Language (HTML), eXtensible Markup Language (XML), Wireless Markup Language (WML), Hypertext Transfer Protocol (HTTP) and Hypertext Transfer Protocol, Secure (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like. In one embodiment, the supported protocols 712 include SOAP and XML for the operation of web service to provide an interface for external management of systems on the Web AS 720.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. An embodiment may include a computer-readable medium having stored thereon data representing sequences of instructions that, when executed by a processor, cause the processor to perform certain operations.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for external management of operation of applications comprising:
   registering a management interface with a registry, the registry being stored on a J2EE™ (Java™ 2 Platform, Enterprise Edition) compatible server, the management interface being a web service, the management interface being compatible with a plurality of different computer platforms including a first computer platform, the web service providing for access for client systems to applications for external management by the client systems of operation of the applications, external management of the operation of the applications including starting, stopping, and monitoring the operation of the applications externally by the client systems;
   locating the management interface in the registry by a first client system;
   connecting the first client system with the management interface of the server, the server having one or more applications including a first application to be managed by the first client system via the management interface, the first application comprising one or more J2EE elements, the first client system utilizing a first computer platform of the plurality of computer platforms;
   initiating by the management interface a start up and control service to provide startup and control for external management by the first client system of operation of the one or more J2EE elements of the first application, the management interface to initiate a same start up and control service for each of the plurality of computer platforms for client systems;
   receiving a first management instruction for external management of operation of the first application from the first client system via the management interface; and
   implementing the first management instruction for the first application using the start up and control service;
   further comprising:
   locating the management interface in the registry by a second client system;
   connecting the second client system with the management interface, the server including a second application, the second client system using a second computer platform of the plurality of computer platforms, the second computer platform being different than the first computer platform, the management interface utilizing the start up and control service for external management by the second client system of operation of one or more elements of the second application;
   receiving a second management instruction for the second application from the second client system via the management interface; and
   implementing the second management instruction for the second application using the start up and control service;
   wherein external management of operation of the first application includes the startup and control service checking a status of the elements of the first application and restarting terminated processes.

2. The method of claim 1, wherein connecting the first client system with the management interface comprises binding the web service for the first client system.

3. The method of claim 1, wherein the first management instruction comprises a SOAP (simple object access protocol) message.

4. A server comprising:
   a processor for processing of applications for the server, the server comprising a J2EE™ (Java™ 2 Platform, Enterprise Edition) compatible platform environment;
   a program engine, the program engine including a first application to be run by the processor, the first application comprising one or more J2EE elements;
   a management interface, the management interface comprising a web service interface that is compatible with a plurality of client platforms, the management interface to connect external clients to applications for the purpose of externally external management of operation of the applications by the external clients, external management of the applications including connection of a first external client with the server for the purpose of externally managing operation of the first application by the first external client, external management of operation of the applications including starting, stopping, and monitoring operation of the applications, the first external client utilizing a first client platform of the plurality of client platforms, the server to receive a first management instruction for the first application from the first external client via the management interface; and
   a registry stored on the server, the registry including registration of the management interface, the registry being accessible to each of the external clients to find the management interface;
   wherein the management interface is to initiate a start up and control service to provide startup and control for external management of operation of the one or more J2EE elements of the first application by the first client system, the management interface to initiate a same start up and control service for each of the plurality of computer platforms for client systems, wherein the first management instruction for the first application is implemented by the startup and control service;
   wherein the server is to receive a first management instruction for external management of operation of the first application via the management interface, and is to implement the first management instruction for the first application using the start up and control service;
   wherein the management interface connects a second external client with the server for the purpose of managing operation of a second application externally by the second external client, the second external client utilizing a second client platform of the plurality of client platforms that is different than the first client platform, the server to receive a second management instruction for the second application from the second external client via the management interface;
   wherein external management of operation of the first application includes the startup and control service checking a status of the elements of the first application and restarting any terminated processes.

5. The server of claim 4, wherein the first management instruction comprises a SOAP (simple object access protocol) message.

6. The server of claim 4, wherein the registry is a UDDI (universal description, discovery, and integration) registry.

7. A system comprising:
an application server including a processor for the processing of applications, the application server supporting one or more applications including a first application, the application server having a J2EE™ (Java™ 2 Platform, Enterprise Edition) compatible computer platform, the first application comprising one or more J2EE elements;
an application management interface, the application management interface being web service based, the application management interface being compatible with a plurality of external system platforms, the application management interface to provide a connection between external systems for external management by external systems of operation of the one or more applications, including a connection between a first external system and the first application for external management by the first external system of operation of the first application, external management of the operation of the first application including starting, stopping, and monitoring operation of the first application, the application management interface to receive management instructions from the first external system for the external management of the first application via the application management interface;
a registry to register the management interface, the registry being accessible to the first external system to find the application management interface; and
a start up and control service, the management interface is to initiate the start up and control service to provide startup and control for management of operation of the one or more J2EE elements of the first application, the management interface to initiate a same start up and control service for each of the plurality of computer platforms for external systems; and
wherein the application server is to receive a first management instruction for external management of operation of the first application via the application management interface, and is to implement the first management instruction for the first application using the start up and control service;
wherein the application management interface connects a second external system with the application server for the purpose of managing operation of a second application externally by the second external system, the second external system utilizing a second system platform of the plurality of system platforms that is different than the first system platform, the server to receive a second management instruction for the second application from the second external system via the management interface;
wherein external management of operation of the first application includes the startup and control service checking the status of the elements of the first application and restarting any terminated processes.

8. A non-transitory computer-readable medium having stored thereon data representing sequences of instructions that, when executed by a processor, cause the processor to perform operations comprising:
registering a management interface with a registry, the registry being stored on a J2EE™ (Java™ 2 Platform, Enterprise Edition) compatible server, the management interface being a web service, the management interface being compatible with a plurality of different computer platforms including a first computer platform and a second computer platform, the second computer platform being different than the first computer platform, the web service providing for access for client systems to applications for external management by the client systems of operation of the applications, external management of the operation of the applications including starting, stopping, and monitoring the operation of the applications externally by the client systems;
locating the management interface in the registry by a first client system;
connecting the first client system with the management interface of the server, the server having one or more applications including a first application to be managed by the first client system via the management interface, the first application comprising one or more J2EE elements, the first client system utilizing a first computer platform of the plurality of computer platforms;
initiating by the management interface a start up and control service to provide startup and control for external management by the first client system of operation of the one or more J2EE elements of the first application, the management interface to initiate a same start up and control service for each of the plurality of computer platforms for client systems;
receiving a first management instruction for external management of the first application from the first client system via the management interface; and
implementing the first management instruction for the first application using the start up and control service;
wherein the instructions include instructions that, when executed by the processor, cause the processor to perform operations comprising:
locating the management interface in the registry by a second client system;
connecting the second client system with the management interface, the server including a second application, the second client system using the second computer platform of the plurality of platforms, the management interface utilizing the start up and control service for external management by the second client system of operation of one or more elements of the second application;
receiving a second management instruction for the second application from the second client system via the management interface; and
implementing the second management instruction for the second application using the start up and control service;
wherein external management of operation of the first application includes the startup and control service checking the status of the elements of the first application and restarting any terminated processes.

9. The medium of claim 8, wherein the first management instruction comprises an instruction for one or more of starting, stopping, and monitoring the one or more elements of the first application.

10. The medium of claim 8, wherein connecting the first client system with the management interface comprises binding the management interface for the first client system.

11. The medium of claim 8, wherein the first management instruction comprises a SOAP (simple object access protocol) message.

* * * * *